United States Patent [19]
Austin

[11] Patent Number: 5,103,864
[45] Date of Patent: Apr. 14, 1992

[54] LIQUID DISTRIBUTION SYSTEMS

[75] Inventor: Eric P. Austin, Sandbach, England

[73] Assignee: Simon-Hartley Limited, Staffs, England

[21] Appl. No.: 544,960

[22] Filed: Jun. 28, 1990

[30] Foreign Application Priority Data

Jul. 1, 1989 [GB] United Kingdom ............... 8915183

[51] Int. Cl.$^5$ ............................................ B01D 21/24
[52] U.S. Cl. .............................. 137/561 A; 210/150; 239/193; 239/498
[58] Field of Search ............... 210/150, 151, 456, 520; 137/561 R, 561 A; 239/193, 498, 499, 550, 557

[56] References Cited

U.S. PATENT DOCUMENTS

| | | | |
|---|---|---|---|
| 2,301,025 | 11/1942 | Friend et al. | 210/150 X |
| 2,767,020 | 10/1956 | Knowles | 210/150 X |
| 2,779,732 | 1/1957 | Knowles | 210/150 |
| 2,889,996 | 6/1959 | Kadden | 210/150 X |
| 3,238,124 | 3/1966 | Burton | 210/150 X |
| 3,940,333 | 2/1976 | Schreiber et al. | 210/150 X |
| 4,086,167 | 4/1978 | Tapola et al. | 210/150 |
| 4,451,362 | 5/1984 | Spelsberg | 210/150 |

Primary Examiner—John Rivell
Attorney, Agent, or Firm—Nies, Kurz, Bergert & Tamburro

[57] ABSTRACT

An outlet assembly for a liquid distribution system of the type whereby liquid is to be deposited onto a treatment bed (13) from one or more apertured distributor pipes (14) connected to a rotary (or linear) supply head (10) the assembly comprising longitudinally spaced apertures (15) opening upwardly in the pipe wall and clamped to the pipe over each aperture (15) a distribution tray (16) extending generally transversely but angularly from the pipe and having a generally horizontal surface (17) with upright side walls (18) so that liquid may flow upwardly through the apertures (15) and be channelled outwardly along the trays to be deposited from the outer ends thereof. The larger than usual apertures (15) ensure that no blockages occur from solids within the liquid, whilst uniform and constant distribution is ensured.

10 Claims, 3 Drawing Sheets

LIQUID DISTRIBUTION SYSTEMS

This invention relates to an outlet assembly for a liquid distribution system.

In the treatment of sewage and other biologically degradable waste water pollutants, much use is made of the so-called trickling or percolating filter. This known device includes a deep bed of materials such as coke, gravel or granular plastics, the purpose of which is to provide a large surface area through which pollutant water, distributed over the bed, may percolate so that various forms of micro-organism may grow and oxidise the pollutants, thus purifying the polluted water.

For efficient operation of such a device the water to be treated must be uniformly distributed over the entire surface of the filter bed so that every part thereof receives the same quantity of pollutant.

Known distribution systems include rectangular filter beds over which travels a distribution pipe mounted on a carriage which runs along a pair of opposed side walls of the bed, and rotary systems in which a central o axial supply pipe has radially extending pipes which rotate about the central vertical axis over a circular filter bed. In each case, the pipe or pipes are conventionally provided with longitudinally spaced outlet apertures such that the liquid and contained solids may issue by gravity from the pipe as it travels over the bed.

Inherently, these systems suffer from the disadvantage that solids within the body of liquid to be distributed tend to cause blockage of the outlet apertures, and sometimes these are very difficult to remove. A typical aperture size is 12 to 50 mm in diameter.

An object of the present invention is to provide a liquid distribution system including an outlet assembly containing much larger orifices thus to avoid blockage and to enhance uniform and efficient distribution.

According to the present invention there is provided an outlet assembly for a liquid distribution system of the type in which liquid is to be deposited onto a treatment bed from one or more apertured distributor pipes connected to a rotary or linear supply head, the assembly comprising at least one pipe mounted on the supply head to extend generally horizontally therefrom, longitudinally spaced apertures in an upper part of the pipe wall from which liquid may flow from the pipe, and a distribution tray about each aperture, which extends from said aperture in at least one direction generally transversely with respect to the pipe, such that liquid may flow upwardly through the apertures and outwardly along the trays to be deposited from an outer end thereof.

An embodiment of the invention will now be described, by way of example only, with reference to the accompanying drawings in which.

Figure 4:
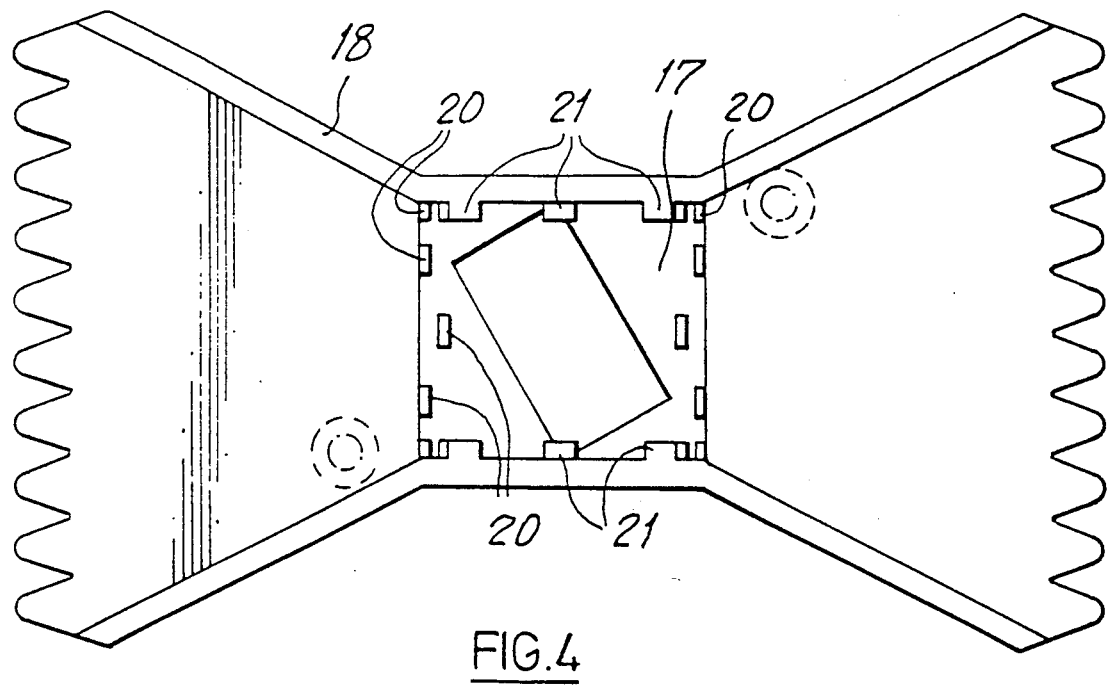
FIG. 4 is a detailed plan view of the part illustrated in FIG. 3.
Figure 5:
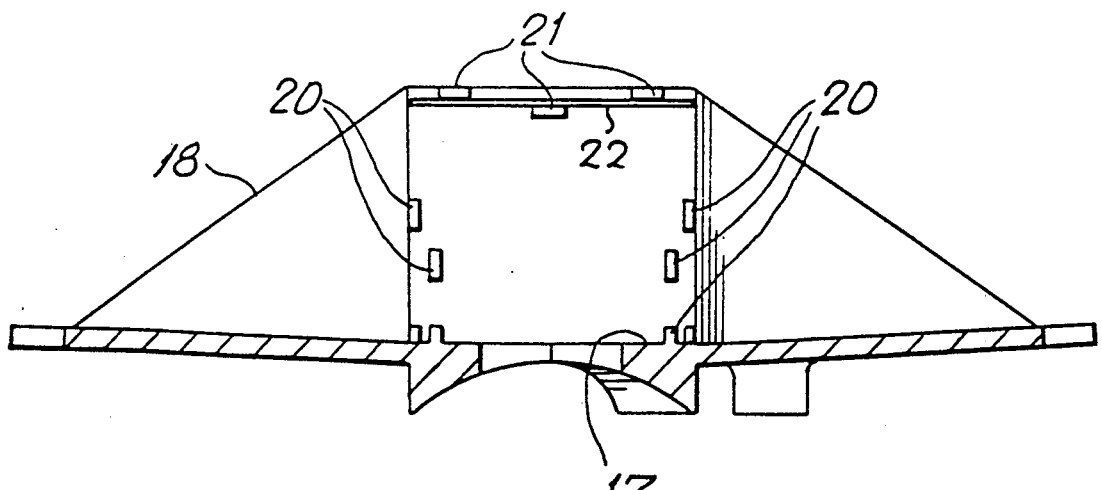

and FIG. 5 is a vertical cross-section taken along line V—V of FIG. 4.

For the purpose of this description a rotary distributor will be referred to though the invention may equally be applied to a linear distributor where the distribution pipe travels along a rectangular filter bed.

Figure 1:
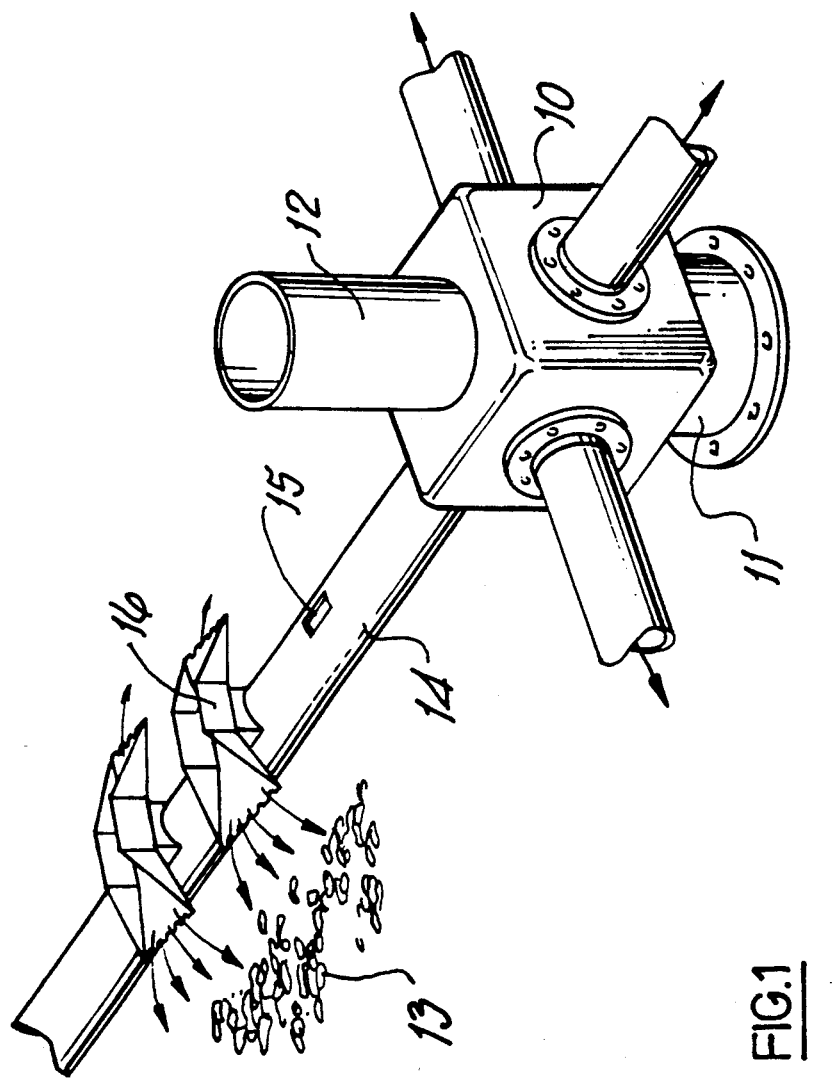
FIG. 1 is a schematic perspective view of a rotary distributor for waste water and made in accordance with the invention.

Referring now to FIG. 1, the distribution system comprises a central supply head 10 mounted for rotation about a vertical axis above a supply pipe 11. An upper support bearing housing 12 is provided to enable the head to rotate about its axis.

The head 10 and pipe 11 are positioned at the centre of a circular filter bed, a part of the surface of which is illustrated at 13.

A number, in this case 4, of distributor pipes 14 extend radially from the head 10 to a position adjacent but within the periphery of the bed.

Figure 2:
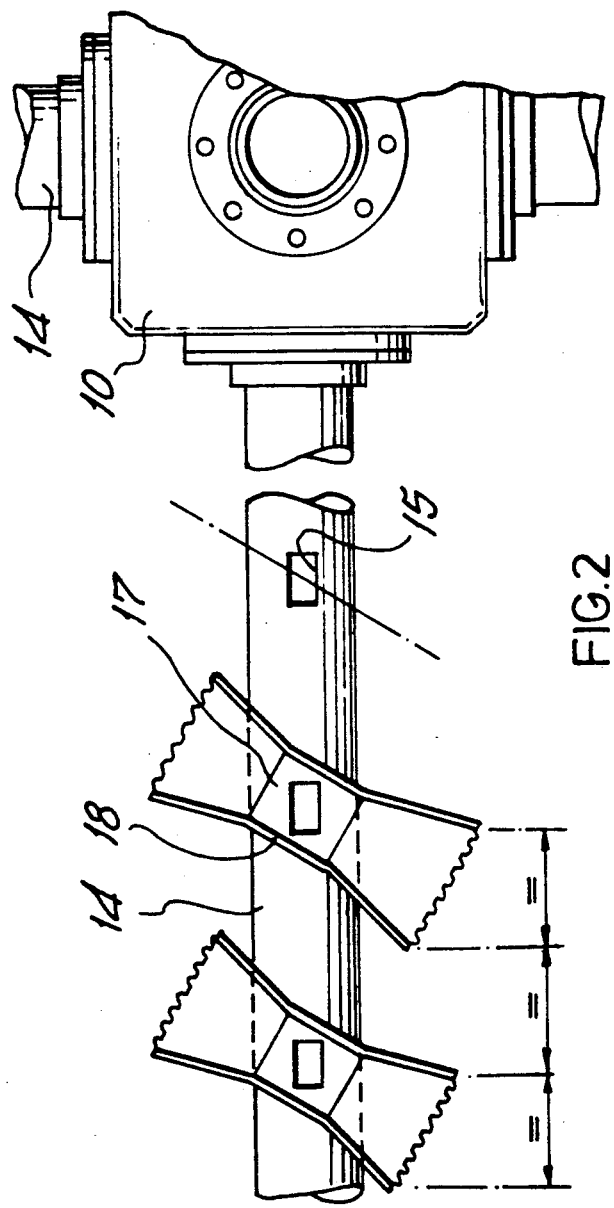
FIG. 2 is a plan view thereof.

As can be seen more readily from FIG. 2, each pipe 14 includes a number of spaced rectangular shaped apertures 15 in its upper region. Each aperture is approximately 100 mm long and 60 mm wide. Above each aperture 15 on the pipe 14 is clamped a distributor box 16 having a generally horizontal base 17 extending outwardly from above the axis of the pipe at an angle of some 60° thereto and containing a central aperture disposed angularly with respect to the base so as to be aligned with the associated aperture 15 in the pipe. The base 17 is of diverging form in plan from its central aperture to a pair of opposed outer ends. Side walls 18 are provided to form a tray for the channelling of liquid issuing from aperture 15 in a generally transverse direction with respect to the longitudinal axis of the pipe. The outer ends of the base or tray of each box 16 are fluted to assist in the even distribution of the liquid onto the surface 13 of the filter bed.

It can be seen clearly from FIG. 2 that the angle of disposition of each distributor box 16 with respect to the pipe 14 and to the next adjacent box is such that liquid is deposited over the entire surface area of the filter bed.

Figure 3:
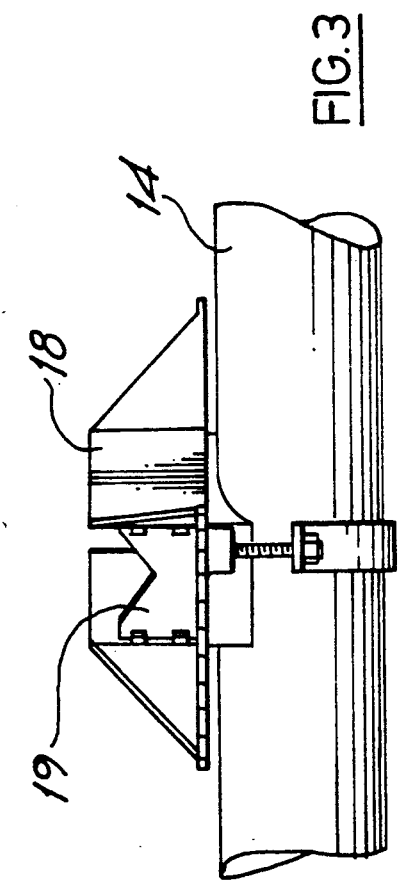
FIG. 3 is an elevation of one part of the apparatus.

As can be seen from FIG. 3 a removable v-notch plate 19 may be placed within the distributor box at each side of the aperture therein in order to control the flow of liquid from the pipe. In addition, as can be seen from FIG. 5 the divergent parts of the base 17 of each box may be inclined upwardly towards its outlet end in order to retain a shallow body of water in the box. Plates 19 of different heights may be inserted at different positions along the pipe in order to ensure uniform flow and distribution of the liquid.

A number of retaining lugs some of which are illustrated at 20 in FIGS. 4 and 5, serve to retain the plates 19. Additionally, a top plate 22 may be retained by further lugs 21 thus to cover the otherwise exposed apertures 15 to prevent objects from falling into the pipe through these apertures and to prevent upward ejection of water spilling over the sides of the box.

It is not intended to limit the invention to the above example only, many variations, such as might readily occur to one skilled in the art, being possible without departing from the scope of the invention.

For example, the distributor boxes 16 may be positioned with their axes normal to that of the pipe, in which case, the divergent parts of each tray may be wider to ensure, as far as possible, uniform distribution over the surface of the bed.

As with conventional distribution systems, the head 10 is rotated at a speed commensurate with the flow of liquid into the system. This speed may be adjustable as the feed varies.

The arrangement is entirely similar on a linear distributor in which a single pipe 14 or a number thereof may be disposed across the width of a rectangular filter bed, and supported for transportation at each end. If more than one pipe is provided in such an arrangement then the distributor boxes may be arranged in alternate positions along the pipes, or again they may be angularly disposed as illustrated in the accompanying drawings.

Distribution systems designed in accordance with the invention ensure good distribution even where the ratio of the velocity head or kinetic energy at the feed end of each pipe, to the pressure drop across each outlet is greater than 0.1, i.e. where $$\frac{V^2}{2g}$$

at the feed end is greater than one tenth of $$\left(\frac{Q}{C \times A_0}\right)^2 \times \frac{1}{g}$$

at the orifice where
 V = Velocity at feed end of pipe
 g = Gravitational constant
 Q = Flow rate through each orifice
 C = Discharge coefficient of orifice
 $A_0$ = Area of Orifice In the embodiments shown, the area of the orifice is in the region of 60 sq cm as compared with a maximum of less than 20 sq cm in conventional systems with bottom feed. The larger orifices of the present invention are acceptable and avoid poor distribution even when there is a reduced liquid feed, as a result of the design of top feed distributor boxes.

What is claimed is:

1. An outlet assembly for a liquid distribution system of the type in which liquid is to be deposited onto a treatment bed from one or more apertured distributor pipes connected to a rotary or linear supply head, the assembly comprising at least one pipe mounted on the supply head to extend generally horizontally therefrom, longitudinally spaced apertures in an upper part of the pipe wall from which liquid may flow from the pipe, and a distribution tray about each aperture, which extends from said aperture in at least one direction generally transversely with respect to the pipe, such that liquid may flow upwardly through the apertures and outwardly along the trays to be deposited from an outer end thereof.

2. An outlet assembly for a liquid distribution system, according to claim 1, in which each said distribution tray is clamped to said pipe and has a generally horizontal base extending outwardly from above the axis of the pipe at an angle of some 60° thereto and containing a central aperture aligned with the associated aperture in the pipe, the tray extending outwardly in opposite directions from its central aperture to a pair of opposed outer ends.

3. An outlet assembly for a liquid distribution system, according to claim 2, including side walls extending upwardly from the side edges of said generally horizontal base, the base being of diverging form from the position of its central aperture to the outer ends, the latter being fluted to assist in the even distribution of liquid therefrom.

4. An outlet assembly for a liquid distribution system, according to claim 1, wherein the angle of transverse disposition of each distribution tray with respect to the pipe, and the distance to the next adjacent tray is such that liquid is deposited over substantially the entire surface area of the filter bed.

5. An outlet assembly for a liquid distribution system, according to claim 1, including a notched plate upstanding from said distribution tray and over which liquid issuing from said pipe must flow before being deposited from the tray thus to control the flow of liquid from the pipe.

6. An outlet assembly for a liquid distribution system, according to claim 5, wherein said notched plate is removably attached to said tray thus to be interchangeable with a plate of a different height.

7. An outlet assembly for a liquid distribution system, according to claim 1, wherein said distribution tray is inclined upwardly from its associated aperture in order to retain a shallow body of water on the tray.

8. An outlet assembly for a liquid distribution system, according to claim 1, including a top plate which may be retained over the central region of said distribution tray thus to cover the otherwise exposed aperture in the pipe to prevent objects from falling into the pipe and to prevent upward ejection of water spilling over the side edges of the tray.

9. A liquid distribution system according to claim 1, wherein each said spaced aperture in the pipe is approximately 100 mm long and 60 mm wide.

10. An outlet assembly for a liquid distribution system, according to claim 1, wherein each distribution tray is positioned to extend normal to the pipe.

* * * * *